United States Patent
Yoo et al.

(10) Patent No.: US 12,504,626 B2
(45) Date of Patent: Dec. 23, 2025

(54) HEAD UP DISPLAY DEVICE

(71) Applicant: Shinyoptics Corp., Tainan (TW)

(72) Inventors: Jinn-Chou Yoo, Tainan (TW);
Chun-Min Chen, Tainan (TW);
Cheng-Shun Liao, Tainan (TW)

(73) Assignee: Shinyoptics Corp., Tainan (TW)

( * ) Notice: Subject to any disclaimer, the term of this patent is extended or adjusted under 35 U.S.C. 154(b) by 516 days.

(21) Appl. No.: 18/059,732

(22) Filed: Nov. 29, 2022

(65) Prior Publication Data
US 2023/0400685 A1   Dec. 14, 2023

(30) Foreign Application Priority Data

Jun. 8, 2022   (TW) .................................. 111121204

(51) Int. Cl.
*G02B 27/01*    (2006.01)
*B60K 35/235*   (2024.01)
*B60K 35/60*    (2024.01)
*G02B 3/00*     (2006.01)
*G02B 5/30*     (2006.01)
*B60K 37/20*    (2024.01)

(52) U.S. Cl.
CPC ........ *G02B 27/0101* (2013.01); *B60K 35/235* (2024.01); *B60K 35/60* (2024.01); *G02B 3/0062* (2013.01); *G02B 5/3066* (2013.01); *B60K 37/20* (2024.01); *B60K 2360/334* (2024.01)

(58) Field of Classification Search
CPC .............. G02B 27/0101; G02B 3/0062; G02B 5/3066; B60K 35/23; B60K 35/233; B60K 35/235; B60K 35/60; B60K 2360/334

See application file for complete search history.

(56) References Cited

U.S. PATENT DOCUMENTS

2017/0329143 A1* 11/2017 Svarichevsky ......... G06F 3/011
2017/0336628 A1* 11/2017 Kim .................... G02B 27/0101

* cited by examiner

*Primary Examiner* — Angela M. Medich
(74) *Attorney, Agent, or Firm* — Wang Law Firm, Inc.

(57) ABSTRACT

A head up display device includes a pancake lens and a picture generation unit. The pancake lens includes a half transmittive concave mirror and a reflective polarizer. The half transmittive concave mirror has a light incident surface and a reflective surface. The reflective polarizer is disposed next to the half transmittive concave mirror at the side of the reflective surface for forming a reflective space therebetween. The picture generation unit is disposed in the direction of the pancake lens opposite to the user's eyes. The picture generation unit generates image light and the image light enters the reflective space from the light incident surface. After the reflection, the image light is directed towards the user's eyes to form a virtual image. The optical path of the virtual image and the image light has an off-axis angle.

9 Claims, 4 Drawing Sheets

HEAD UP DISPLAY DEVICE

CROSS-REFERENCE TO RELATED APPLICATION

This application claims the benefit of Taiwan Patent Application No. 111121204, filed on Jun. 8, 2022, in the Taiwan Intellectual Property Office, the disclosure of which is incorporated herein in its entirety by reference.

BACKGROUND OF THE INVENTION

1. Field of the Invention

The present disclosure generally relates to a head up display (HUD) device, in particular to a head up display device which is able to include pancake lens.

2. Description of the Related Art

When a user is driving a vehicle, driving information is needed to assist in judging the conditions regarding the vehicle and the road. On different vehicles, variously designed dashboards and display screens can present the above-mentioned driving information to the user according to the sensing devices install in the vehicle. However, in the state of driving, especially in high-speed driving, if the user needs to look down at the information on the dashboard, or the displayed text and numbers cannot present the information in a simple fashion, it may cause difficulty in obtaining the driving information, or even cause distraction which leads to traffic accidents.

In response to the above issue, many vehicles are equipped with head-up display devices to project driving information, such as vehicle speed, whether speed limit is exceeded, time and other information on the display screen or windshield, so that users do not have to look down to the dashboard while driving, and may pay attention to the external road conditions and vehicle conditions, and obtains driving information at the same time under the head-up line of sight. However, in the existing head up display devices, the imaging unit is arranged between the display screen and the user, which causes obstructions to line of sight, and the installation area on the dashboard of the vehicle is limited, so it is difficult for the existing head up display to provide appropriate driving information display without blocking the line of sight. Therefore, the user still feels considerable inconvenience when driving the vehicle.

In view of the foregoing, the inventors of the present disclosure have considered and designed a head up display device to alleviate the problems of the prior art, thereby enhancing implementation and utilization in the industry.

SUMMARY OF THE INVENTION

Therefore, it is a primary objective of the present disclosure to provide a head up display device to solve the problems of the setting position of the picture generation unit of conventional head up display and the display quality of the coaxial virtual image.

To achieve the foregoing objective, the present disclosure provides a head up display device, comprising: a pancake lens and a picture generation unit. The pancake lens includes a half transmittive concave mirror and a reflective polarizer, wherein the half transmittive concave mirror includes a light incident surface and a reflective surface, the reflective polarizer being disposed on the reflective surface and being combined with the half transmittive concave mirror to form a reflective space. The picture generation unit is disposed on a direction of the pancake lens opposite to the user's eyes, the picture generation unit generates an image light which enters the reflective space through the light incident surface, after reflection, a virtual image is formed towards the user's eyes by the image light passing through the reflective polarizer, wherein optical paths of the virtual image and the image light have an off-axis angle.

In a preferred embodiment, the reflective polarizer may include a quarter wave plate disposed between the half transmittive concave mirror and the reflective polarizer.

In a preferred embodiment, the image light generated by the picture generation unit may be a p-polarized light, which enters the reflective space, then being converted to a s-polarized light by the quarter wave plate, the reflective polarizer reflects the s-polarized light to the half transmittive concave mirror, after reflection, the image light passes through the quarter wave plate again to be converted to p-polarized light which penetrates the reflective polarizer.

In a preferred embodiment, the eye relief between the pancake lens and the user's eyes may be about more than 300 mm.

In a preferred embodiment, an imaging distance of the virtual image (virtual image distance) may be about more than 1.0 m.

In a preferred embodiment, a horizontal field of vision of the virtual image may be about more than 12°, and a vertical field of vision of the virtual image may be about more than 4°.

In a preferred embodiment, a range of movement of the user's eyes (eye box) may be about 65 mm×10 mm~150 mm×50 mm.

In a preferred embodiment, the off-axis angle may be about 15°~40°.

In a preferred embodiment, the head up display device may further comprise an adjustment device connected to the pancake lens, the adjustment device adjusts an inclination angle of the pancake lens to adjust the off-axis angle.

In a preferred embodiment, the head up display device may further comprise a sensing device connected to the adjustment device, the sensing device detects a position of the user's eyes, and the adjustment device adjusts an inclination angle of the pancake lens based on the position detected.

The head up display device of the present disclosure has the following advantages:

(1) The head up display device of the present disclosure can utilize the reflective space in the pancake lens to reflect the image light, so that the optical path of the virtual image formed toward the user's eyes has an off-axis angle with the optical path of the original image light, and thus the setting position of the picture generation unit will not overlap with the image, which will affect the imaging effect, and effectively improve the display quality.

(2) The head up display device of the present disclosure can place the picture generation unit on the opposite side of the lens group from the user's eyes through the configuration of the lens group, thus increases the flexibility of the setting position of the picture generation unit, and avoids the limitation of space due to being arranged between the user and the lens group, and improves the aesthetics and practicability of the device.

(3) The head up display device of the present disclosure can adjust the angle of the lens group by adjusting the device, so that different users may all have a good visual experience, and may also significantly improve the efficiency and imaging quality in actual usage through the automatic adjustments of the sensing device.

BRIEF DESCRIPTION OF THE DRAWINGS

The detailed structure, operating principle and effects of the present disclosure will now be described in more details hereinafter with reference to the accompanying drawings that show various embodiments of the invention as follows.

DETAILED DESCRIPTION OF THE PREFERRED EMBODIMENTS

The technical content of the present disclosure will become apparent by the detailed description of the following embodiments and the illustration of related drawings as follows. The drawings are merely illustrative in nature and is in no way intended to limit the disclosure, its application, or uses. Therefore, while this disclosure may include particular ratio or configuration, the true scope of the disclosure should not be limited to such examples.

All terms (including technical and scientific terms) used herein have the meaning as commonly understood by one of ordinary skill in the art to which this disclosure belongs. It will be further understood that terms such as those defined in commonly used dictionaries should be construed as having meanings consistent with their meanings in the context of the related art and the present invention, and are not to be construed as idealized or excessively formal meaning unless expressly so defined herein.

Figure 1:
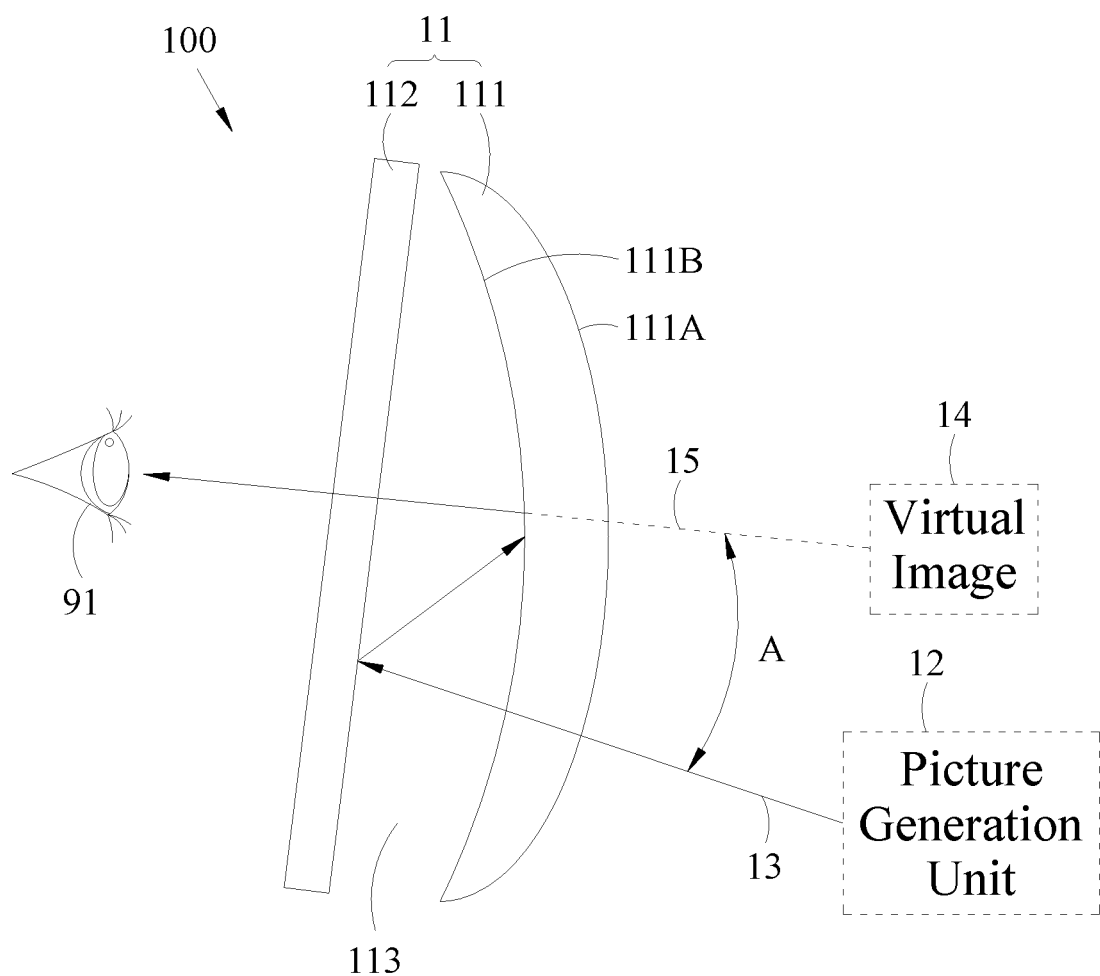
FIG. 1 is a schematic view of the head up display device according to an embodiment of the present disclosure.

With reference to FIG. 1 for a schematic view of the head up display device according to an embodiment of the present disclosure. As shown in the figure, the head up display device 100 includes a pancake lens 11 and a picture generation unit 12, the pancake lens 11 includes a half transmittive concave mirror 111 and a reflective polarizer 112. The half transmittive concave mirror 111 being combined with the reflective polarizer 112 to form a pancake-like lens group, wherein the half transmittive concave mirror 111 includes a light incident surface 111A and a reflective surface 111B, the reflective polarizer 112 being disposed on direction of the reflective surface 111B, and forming a reflective space 113 between the reflective polarizer 112 and the half transmittive concave mirror 111. The reflective space 113 is a space to induce one or more reflections of an incident light.

The picture generation unit 12 is disposed on a direction of the pancake lens 11 opposite to the user's eyes 91, in other words, the light incident surface 111A of the half transmittive concave mirror 111 faces towards the picture generation unit 12, and the reflective surface 111B faces towards the user's eyes 91. This configuration sets the picture generation unit 12 behind the pancake lens 11 from the user's prospective, thus prevents the picture generation unit 12 from being located between the user and the lens group which may cause problems in spatial configuration and visual obstacles. The picture generation unit 12 may be connected to the dashboard or to the on-board computer to receive relevant driving information when the vehicle is running, and projects the information in the form of text, numbers or images to the pancake lens 11 through a light-emitting device of the picture generation unit 12. The picture generation unit 12 projects the image light 13 of the generated images towards the half transmittive concave mirror 111, and enters the reflective space 113 through the light incident surface 111A. After being reflected by the reflective polarizer 112 and the reflective surface 111B of the half transmittive concave mirror 111, the image light 13 passes through the reflective polarizer 112 to form a virtual image 14 towards the user's eyes 91.

Since the image light 13 undergoes one or more reflections in the reflective space 113, the optical path where the original image light 13 is incident and the image optical path 15 on which the virtual image 14 is finally formed have an off-axis angle A, where the off-axis angle A is about 15°~40°, for example about 30°. The generation of the off-axis angle A makes the optical path that generates the image and the virtual image are not on the same axis, this off-axis design can make the head up display 100 more flexible in the setting position of the image generating unit 12, and also prevent the position of the image and the device from overlapping, and thus avoid poor viewing experience of the user which affects the display effect of the head up display 100.

Figure 2:
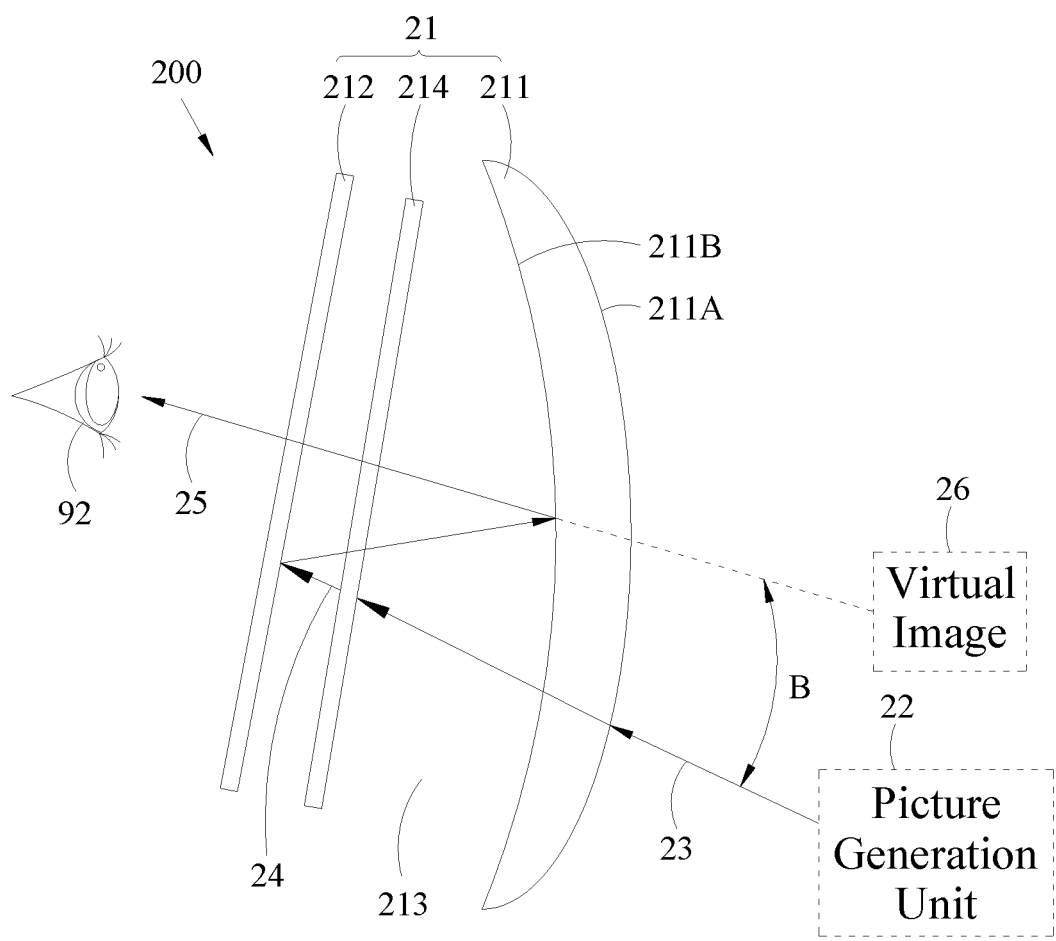
FIG. 2 is a schematic view of the head up display device according to another embodiment of the present disclosure.

With reference to FIG. 2 for a schematic view of the head up display device according to another embodiment of the present disclosure. As shown in the figure, the head up display device 200 includes a pancake lens 21 and a picture generation unit 22, similar to the previous embodiment, the pancake lens 21 includes a half transmittive concave mirror 211 and a reflective polarizer 212. The half transmittive concave mirror 211 includes a light incident surface 211A and a reflective surface 211B, in which the light incident surface 211A face towards the picture generation unit 22, and the reflective surface 211B face towards the user's eyes 92. As such, the user and the picture generation unit 22 are located on two different sides of the lens group, thus increasing the design space.

The reflective polarizer 212 being disposed on the direction of the reflective surface 211B of the half transmittive concave mirror 211, and forming a reflective space 213 between the reflective polarizer 212 and the half transmittive concave mirror 211. The reflective space 213 is a space to induce one or more reflections of an incident light. What differs from the previous embodiment is that the reflective polarizer 212 further includes a quarter (¼) wave plate 214 located between the half transmittive concave mirror 211 and the reflective polarizer 212.

The picture generation unit 22 may be connected to the dashboard or to the on-board computer to receive relevant driving information when the vehicle is running, and projects the information in the form of text, numbers or images to the pancake lens 21 through a light-emitting device of the picture generation unit 22. The picture generation unit 22 projects the images to be shown in a form of a p-polarized light 23 (or being converted to the p-polarized light by a quarter wave plate) towards the half transmittive concave mirror 211, which enters the reflective space 213 through the light incident surface 211A, and then pass through the quarter wave plate 214 to be converted to a s-polarized light 24. After the s-polarized light 24 being reflected by the reflective polarizer 212 towards the half transmittive concave mirror 211, and being reflected again by the half transmittive concave mirror 211, the s-polarized light 24 passes through the quarter wave plate 214 again to be converted to a p-polarized light 25 which penetrates the reflective polarizer 212 to form a virtual image 26 towards the user's eyes 92. Although the present embodiment described the picture generation unit 22 generates the image light in a form of a p-polarized light 23, but the present disclosure are not limited thereto, for example in other embodiments, the picture generation unit 22 may also generates the image light in a form of a s-polarized light which is the opposite of the above embodiment, but also undergo the conversion and one or more reflections to form the virtual image 26 towards the user's eyes 92.

Since the optical path of the light emitted by the picture generation unit 22 (the path of the p-polarized light 23) and the optical path of the virtual image 26 observed by the user (the path of the p-polarized light 25) are non-coaxial and off-axis paths, there is an off-axis angle B between the two, and the off-axis angle B is about 15°~40°, for example about 30°. The generation of the off-axis angle B makes the optical path that generates the image and the virtual image not on the same axis, so the off-axis design can make the head up display device 200 more flexible in the setting position of the image generating unit 22, and so the image and the position of the device will not be overlapped, so as to avoid poor viewing experience of the user and affecting the display effect of the head up display device 200.

Figure 3:
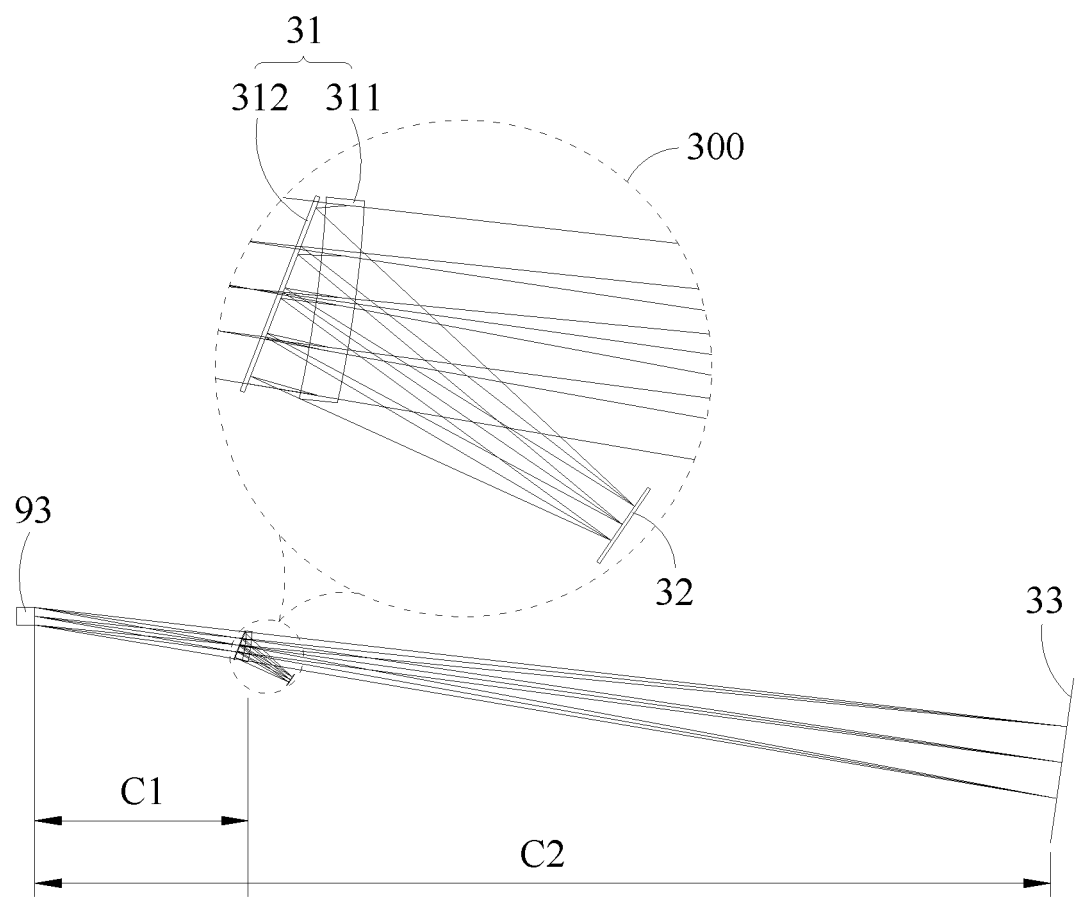
FIG. 3 is a schematic view showing the imaging of virtual image according to an embodiment of the present disclosure.

With reference to FIG. 3 for a schematic view showing the imaging of virtual image according to an embodiment of the present disclosure. As shown in the figure, the head up display device 300 includes a pancake lens 31 and a picture generation unit 32, the pancake lens 31 includes a half transmittive concave mirror 311 and a reflective polarizer 312, the configuration of the half transmittive concave mirror 311 and the reflective polarizer 312 are the same as the previous embodiment, so the description will not be repeated herein. The picture generation unit 32 is disposed on a direction of the pancake lens 31 opposite to the user's eyes 93, wherein the picture generation unit 32 generates an image light entering the reflective space from the light incident surface of the half transmittive concave mirror 311, after reflection, the image light passes through the reflective polarizer 312 towards the user's eyes 93 to form a virtual image 33.

In the present embodiment, the eye relief C1 between the pancake lens 31 and the user's eyes 93 may be about more than 300 mm, for example ranged between about 300 mm~700 mm, or about 500 mm, and an imaging distance C2 of the virtual image 33 observed by the user is about more than 1 m, for example ranged between about 1.0 m~3.0 m, or about 1.5 m. In addition, the field of view of the user's eyes 93 may be divided into a horizontal field of vision and a vertical field of vision. In the present embodiment, the horizontal field of vision may be about more than 12°, the vertical field of vision may be about more than 4°, for example about 18°×5°. The range of movement of the user's eyes 93 may be about 65 mm×10 mm~150 mm×50 mm, for example about 130 mm×40 mm. The optical path of the forward initial light of the picture generation unit 32 and the optical path of the virtual image 33 will have an off-axis angle, and the off-axis angle may be about 15°~40°. Since the picture generation unit 32 and the virtual image 33 are designed to be off-axis, the picture generation unit 32 will not overlap with the virtual image 33 to affect the display effect.

Figure 4:
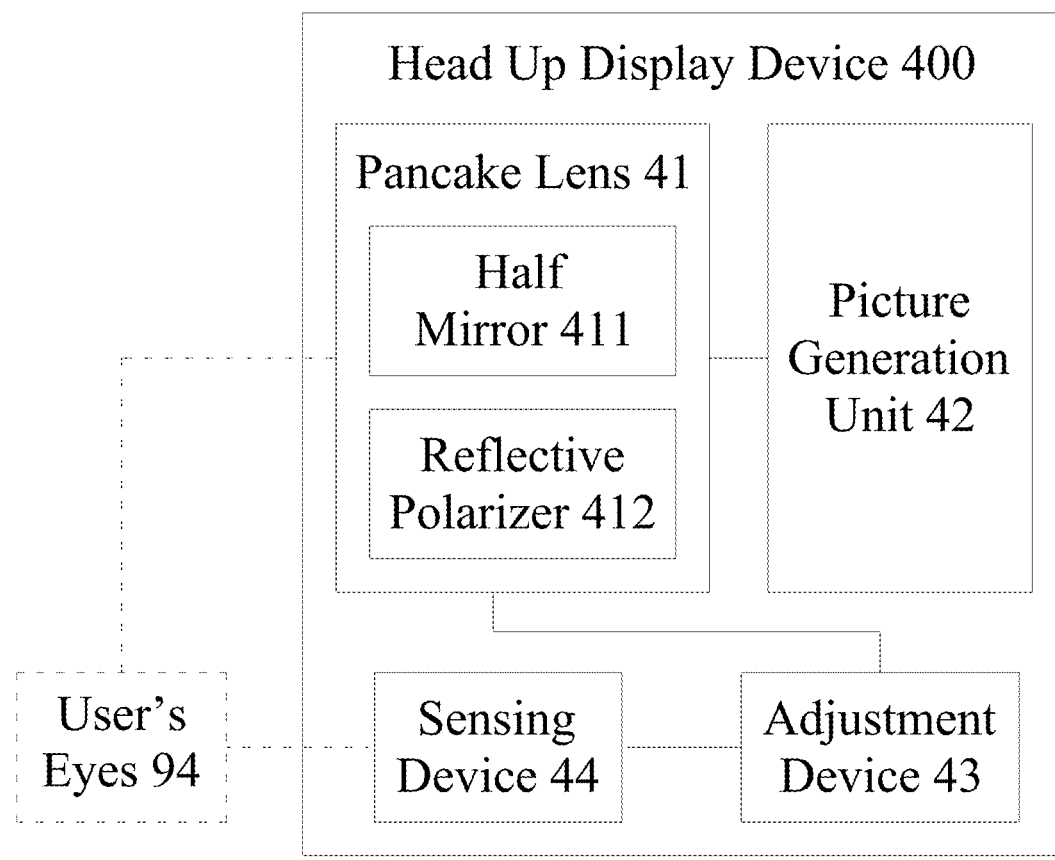
FIG. 4 is a block diagram showing the system of the head up display device according to an embodiment of the present disclosure.

With reference to FIG. 4 for a block diagram showing the system of the head up display device according to an embodiment of the present disclosure. As shown in the figure, the head up display device 400 includes a pancake lens 41, a picture generation unit 42, an adjustment device 43 and a sensing device 44. Wherein, the pancake lens 41 includes a half transmittive concave mirror 411 and a reflective polarizer 412, the half transmittive concave mirror 411 being combined with the reflective polarizer 412 to form a pancake-like lens group, wherein the half transmittive concave mirror 411 includes a light incident surface and a reflective surface, the reflective polarizer 412 being disposed on direction of the reflective surface, and forming a reflective space between the reflective polarizer 412 and the half transmittive concave mirror 411. The reflective space is a space to induce one or more reflections of an incident light.

The picture generation unit 42 is disposed on a direction of the pancake lens 41 opposite to the user's eyes 94, in other words, the light incident surface of the half transmittive concave mirror 411 faces towards the picture generation unit 42, and the reflective surface faces towards the user's eyes 94. This configuration sets the picture generation unit 42 behind the pancake lens 41 from the user's prospective, thus prevents the picture generation unit 12 from being located between the user and the lens group which may cause problems in spatial configuration and visual obstacles. The picture generation unit 42 may be connected to the dashboard or to the on-board computer to receive relevant driving information when the vehicle is running, and projects the information in the form of text, numbers or images to the pancake lens 41 through a light-emitting device of the picture generation unit 42. The picture generation unit 42 projects the image light of the generated images towards the half transmittive concave mirror 411, and enters the reflective space through the light incident surface. After being reflected by the reflective polarizer 412 and the reflective surface of the half transmittive concave mirror 411, the image light passes through the reflective polarizer 412 to form a virtual image towards the user's eyes 94.

For different users, according to the differences in body shape, eye height, eye width, etc., the inclination angle of the pancake lens 41 can be adjusted by the adjustment device 43, so that the user can obtain the best angle when viewing the virtual image. The adjustment device 43 may include a mechanical or electronic adjusting mechanism, which is connected to the half transmittive concave mirror 411 and the reflective polarizer 412, and can be adjusted according to user needs. In addition, when the user operates the head up display 400, the sensing device 44 of the head up display 400 can detect the position of the user's eyes 94, for example, a pupil tracking device is used to detect the movement state of the user's eyes 94, and the information is sent to the adjustment device 43 according to the detected position, and the adjustment device 43 transmits corresponding control commands to adjust the inclination angle of the pancake lens 41 and change the off-axis angle, so that the eye relief between the pancake lens and the user's eyes and the imaging distance of the virtual image can achieve the best display effect, and the user's field of view and the range of movement of the eyes are also adjusted accordingly.

While the means of specific embodiments in present disclosure has been described by reference drawings, numerous modifications and variations could be made thereto by those skilled in the art without departing from the scope and spirit of the invention set forth in the claims. The modifications and variations should in a range be limited by the claims of the present disclosure.

What is claimed is:

1. A head up display device, comprising: a pancake lens including a half transmittive concave mirror and a reflective polarizer, the half transmittive concave mirror including a light incident surface and a reflective surface opposite to the light incident surface, the reflective polarizer being disposed next to the half transmittive concave mirror at a side of the reflective surface to form a reflective space therebetween; and a picture generation unit, disposed on a direction of the pancake lens opposite to user's eyes, the picture generation unit being configured to generate an image light which enters the reflective space through the light incident surface of the half transmittive concave mirror, after reflection, a virtual image is formed towards the user's eyes by the reflected image light passing through the reflective polarizer, wherein optical paths of the virtual image and the image light have an off-axis angle, wherein the off-axis angle is about 15°~40°.

2. The head up display device of claim 1, wherein the pancake lens includes a quarter wave plate disposed between the half transmittive concave mirror and the reflective polarizer.

3. The head up display device of claim 2, wherein the image light generated by the picture generation unit is a p-polarized light, which enters the reflective space, then being converted to a s-polarized light by the quarter wave plate, the reflective polarizer reflects the s-polarized light to the half transmittive concave mirror, after reflection, the image light passes through the quarter wave plate again to be converted to p-polarized light which penetrates the reflective polarizer.

4. The head up display device of claim 1, wherein an imaging distance of the virtual image is about more than 1.0 m.

5. The head up display device of claim 1, wherein the head up display device is configured to provide an eye box of about 65 mm×10 mm~150 mm×50 mm.

6. The head up display device of claim 1, further comprising an adjustment device connected to the pancake lens, the adjustment device adjusts an inclination angle of the pancake lens to adjust the off-axis angle.

7. The head up display device of claim 6, further comprising a sensing device connected to the adjustment device, the sensing device detects a position of the user's eyes, and the adjustment device adjusts an inclination angle of the pancake lens based on the position detected.

8. A head up display device, comprising:
a pancake lens including a half transmittive concave mirror and a reflective polarizer, the half transmittive concave mirror including a light incident surface and a reflective surface opposite to the light incident surface, the reflective polarizer being disposed next to the half transmittive concave mirror at a side of the reflective surface to form a reflective space therebetween; and
a picture generation unit, disposed on a direction of the pancake lens opposite to user's eyes, the picture generation unit being configured to generate an image light which enters the reflective space through the light incident surface of the half transmittive concave mirror, after reflection, a virtual image is formed towards the user's eyes by the reflected image light passing through the reflective polarizer, wherein optical paths of the virtual image and the image light have an off-axis angle, wherein the eye relief between the pancake lens and the user's eyes is about more than 300 mm.

9. A head up display device, comprising:
a pancake lens including a half transmittive concave mirror and a reflective polarizer, the half transmittive concave mirror including a light incident surface and a reflective surface opposite to the light incident surface, the reflective polarizer being disposed next to the half transmittive concave mirror at a side of the reflective surface to form a reflective space therebetween; and
a picture generation unit, disposed on a direction of the pancake lens opposite to user's eyes, the picture generation unit being configured to generate an image light which enters the reflective space through the light incident surface of the half transmittive concave mirror, after reflection, a virtual image is formed towards the user's eyes by the reflected image light passing through the reflective polarizer, wherein optical paths of the virtual image and the image light have an off-axis angle, wherein a horizontal field of vision of the virtual image is about more than 12°, and a vertical field of vision of the virtual image is about more than 4°.

* * * * *